(12) United States Patent
Rainisto

(10) Patent No.: US 10,409,464 B2
(45) Date of Patent: Sep. 10, 2019

(54) PROVIDING A CONTEXT RELATED VIEW WITH A WEARABLE APPARATUS

(71) Applicant: Microsoft Technology Licensing, LLC, Redmond, WA (US)

(72) Inventor: Roope Rainisto, Helsinki (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 166 days.

(21) Appl. No.: 14/661,293

(22) Filed: Mar. 18, 2015

(65) Prior Publication Data
US 2016/0274765 A1    Sep. 22, 2016

(51) Int. Cl.
| G06F 3/01 | (2006.01) |
| G06F 3/0484 | (2013.01) |
| G06F 3/16 | (2006.01) |
| G06F 3/0482 | (2013.01) |
| G06F 3/0481 | (2013.01) |
| G02B 27/01 | (2006.01) |

(52) U.S. Cl.
CPC ....... G06F 3/04842 (2013.01); G02B 27/017 (2013.01); G06F 3/011 (2013.01); G06F 3/012 (2013.01); G06F 3/0482 (2013.01); G06F 3/04815 (2013.01); G06F 3/04847 (2013.01); G06F 3/167 (2013.01); *G02B 2027/014* (2013.01); *G02B 2027/0187* (2013.01)

(58) Field of Classification Search
CPC combination set(s) only.
See application file for complete search history.

(56) References Cited

U.S. PATENT DOCUMENTS

| 7,707,073 | B2 | 4/2010 | Bloebaum et al. |
| 8,643,951 | B1* | 2/2014 | Wheeler ................ G06F 3/012 359/630 |
| 9,268,136 | B1* | 2/2016 | Starner ................ G02B 27/017 |
| 9,665,249 | B1* | 5/2017 | Ding ..................... G06F 3/0484 |
| 2004/0161132 | A1* | 8/2004 | Cohen .................... G06T 7/246 382/103 |
| 2008/0043013 | A1 | 2/2008 | Gruttadauria et al. |
| 2010/0125816 | A1* | 5/2010 | Bezos .................. G06F 1/1626 715/863 |
| 2010/0199232 | A1 | 8/2010 | Mistry et al. |
| 2010/0229125 | A1* | 9/2010 | Cha ......................... G06F 3/017 715/828 |
| 2010/0328344 | A1* | 12/2010 | Mattila ................ G06F 1/1626 345/633 |

(Continued)

OTHER PUBLICATIONS

"Mobile Projector—Phones", Dec. 11, 2014 Available at : http://www.mobilevce.com/newsite/sites/default/files/infostore/brief_STEERABLE%20PROJECT%283%29.pdf.

(Continued)

*Primary Examiner* — Hien L Duong

(57) ABSTRACT

A wearable apparatus comprises at least one processing unit and at least one memory. The at least one memory stores program instructions that, when executed by the at least one processing unit, cause the apparatus to detect a context related view activation input from a user, determine a context in response to detecting the context related view activation input from the user, and cause a view relating to the context to be provided with the wearable apparatus such that the view appears to be at ground level around at least one foot of the user.

20 Claims, 5 Drawing Sheets

(56) References Cited

U.S. PATENT DOCUMENTS

| | | | | |
|---|---|---|---|---|
| 2011/0249122 | A1* | 10/2011 | Tricoukes | G02B 27/017 348/158 |
| 2012/0162254 | A1 | 6/2012 | Anderson et al. | |
| 2012/0206452 | A1 | 8/2012 | Geisner et al. | |
| 2013/0030915 | A1 | 1/2013 | Statler et al. | |
| 2013/0050432 | A1* | 2/2013 | Perez | H04N 13/0278 348/47 |
| 2013/0135353 | A1* | 5/2013 | Wheeler | G09G 3/003 345/660 |
| 2013/0346262 | A1 | 12/2013 | Hadden et al. | |
| 2014/0063058 | A1 | 3/2014 | Fialho et al. | |
| 2014/0100994 | A1 | 4/2014 | Tatzel et al. | |
| 2014/0129374 | A1 | 5/2014 | Pradeep | |
| 2014/0164282 | A1 | 6/2014 | Asbury | |
| 2014/0207615 | A1* | 7/2014 | Li | G06Q 30/0623 705/26.61 |
| 2014/0214481 | A1 | 7/2014 | Argue et al. | |
| 2014/0267400 | A1* | 9/2014 | Mabbutt | G06T 19/006 345/633 |
| 2015/0128096 | A1* | 5/2015 | Rizvi | G02B 27/017 715/863 |
| 2015/0293362 | A1* | 10/2015 | Takahashi | G02B 27/02 348/47 |
| 2015/0355709 | A1* | 12/2015 | Lee | G02B 27/0172 345/156 |
| 2016/0131908 | A1* | 5/2016 | Fateh | G06F 3/147 345/633 |
| 2016/0253710 | A1* | 9/2016 | Publicover | G06Q 30/02 |

OTHER PUBLICATIONS

Pubudu, Suravi, "Interactive Floor Foot Ball", Published on: Jul. 17, 2014 Available at: https://www.youtube.com/watch?v=3q7qT3OA1Mo.

Girouard, et al., "All-Channel Experience: Engaging with Technology—Enabled Shoppers In-Store", Published on: Apr. 12, 2012 Available at: http://www.in.capgemini.com/resource-file-access/resource/pdf/All-Channel_Experience_Engaging_with_Technology-_Enabled_Shoppers_In-Store.pdf.

* cited by examiner

PROVIDING A CONTEXT RELATED VIEW WITH A WEARABLE APPARATUS

BACKGROUND

Various electronic devices, for example, smartphones, tablets and wearable devices may be used to provide a so called augmented reality experience to a user. In the augmented reality elements of the real-world environment are augmented or supplemented by computer-generated input. Artificial information about the environment and also its objects can be overlaid on the real world.

SUMMARY

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one example, a method for providing a context related view with a wearable apparatus is provided. The method comprises detecting a context related view activation input from a user, determining a context in response to detecting the context related view activation input from the user, and providing a view relating to the context with the wearable apparatus such that the view appears to be at ground level around at least one foot of the user.

In another example, a wearable apparatus for providing a context related view is provided. The wearable apparatus comprises at least one processing unit, at least one memory. The at least one memory stores program instructions that, when executed by the at least one processing unit, cause the apparatus to detect a context related view activation input from a user, determine a context in response to detecting the context related view activation input from the user, and provide a view relating to the context with the wearable apparatus such that the view appears to be at ground level around at least one foot of the user.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
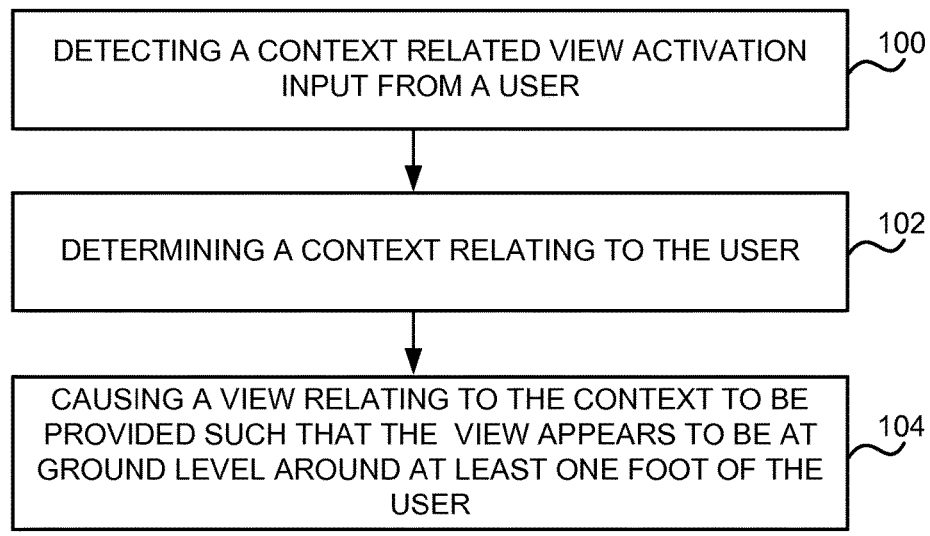
FIG. 1 illustrates a flow diagram of a method for providing a context related view with a wearable apparatus.

FIG. 1 illustrates a flow diagram of a method for providing a context related view with a wearable apparatus. The wearable apparatus may refer to any apparatus that may be worn by a user, for example, eyeglasses, contact lenses, a head-mounted display device etc.

At 100 a context related view activation input is detected from a user. The context related view refers, for example, to a computer generated view that provides some additional information to the user. The context related view activation input refers to, for example, to voice input or voice command from the user or to a user gesture detected by the apparatus. In one example, it is detected that the user tilts his head towards the feet of the user, and this is interpreted as the activation input from the user.

At 102 a context is determined in response to detecting the context related view activation input from the user. The term "context" refers to one or more parameters that alone or together define the user's current state and/or the current state of the wearable apparatus. For example, at least one of a location of the user, time, movement status of the user, position of the user and orientation of the user, status of the user (for example, calendar status), status of the wearable apparatus or an apparatus connected to the wearable apparatus, and connectivity of the wearable apparatus may affect to the context.

At 104 a view relating to the context is caused to be provided with the wearable apparatus such that the view appears to be at ground level around at least one foot of the user. In other words, for example, when the user looks down towards his feet, he sees the view around his feet. In one example, prior to providing the view with the wearable apparatus, at least one foot of the user may be detected. When the view is then provided, the view is provided at ground level such that the least one foot blocks those parts of the view falling on the at least one foot.

When the apparatus detects a context related view deactivation input from the user, the view appearing at the ground level around the least one foot of the user may be removed. The deactivation input may refer, for example, to a voice command from the user. The view may also be removed when it is detected that the user raises his head and does not any more look towards his feet.

The example described above enables an intuitive way for a user to automatically activate and deactivate a context related view. Further, since the wearable apparatus is aware of its context and possibly also the user's context (for example, time, location, movement status of the user, etc.), the wearable apparatus is also able to determine the correct view to be provided at ground level to the user without further user input.

FIG. 2A illustrates a system diagram of a wearable apparatus 200 for providing a context related view. The wearable apparatus 200 may refer to any apparatus that may be worn by a user, for example, eyeglasses, contact lenses, a head-mounted display device etc. The wearable apparatus 200 including a variety of optional hardware and software components, shown generally at 232. Any components 232 in the wearable apparatus can communicate with any other component, although not all connections are shown, for ease of illustration.

The illustrated wearable apparatus 200 can include a controller or processor 202 (e.g., signal processor, microprocessor, ASIC, or other control and processing logic circuitry) for performing such tasks as signal coding, data processing, input/output processing, power control, and/or other functions. An operating system can control the allocation and usage of the components 232 and support for one or more application programs.

The illustrated wearable apparatus 200 can include a memory 204. The memory 204 can include non-removable memory 206 and/or removable memory 208. The non-removable memory 206 can include RAM, ROM, flash memory, a hard disk, or other well-known memory storage technologies. The removable memory can include flash memory or a Subscriber Identity Module (SIM) card, which is well known in GSM communication systems, or other well-known memory storage technologies, such as "smart cards". The memory 204 can be used for storing data and/or code for running the operating system and the applications. Example data can include web pages, text, images, sound files, video data, or other data sets to be sent to and/or received from one or more network servers or other devices via one or more wired or wireless networks. The memory 204 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The wearable apparatus 200 can support one or more input devices 210, such as a microphone 212 or a camera 214 or cameras, and one or more output devices 216, such as a display 218. Other possible output devices (not shown) can include piezoelectric or other haptic output devices. Some devices can serve more than one input/output function. The input devices 210 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system or applications can comprise speech-recognition software as part of a voice user interface that allows a user to operate the wearable apparatus 200 via voice commands. Further, the wearable apparatus 200 can comprise input devices and software that allows for user interaction via a user's spatial gestures, such as detecting and interpreting gestures to provide input to a gaming application.

A wireless modem 220 can be coupled to an antenna (not shown) and can support two-way communications between the processor 202 and external devices, as is well understood in the art. The modem 220 is shown generically and can include a cellular modem for communicating with the mobile communication network and/or other radio-based modems (e.g., Bluetooth or Wi-Fi). The wireless modem 220 is typically configured for communication with one or more cellular networks, such as a GSM network for data and voice communications within a single cellular network, a WCDMA (Wideband Code Division Multiple Access) network, an LTE (Long Term Evolution) network, a 4G LTE network, between cellular networks, or between the mobile device and a public switched telephone network (PSTN) etc.

The wearable apparatus 200 can further include at least one input/output port 222, a satellite navigation system receiver 224, such as a Global Positioning System (GPS) receiver, an accelerometer 226, a physical connector 228, which can be, for example, a USB port, and/or a gyroscope 230. The illustrated components 232 are not required or all-inclusive, as any components can deleted and other components can be added.

Figure 2:
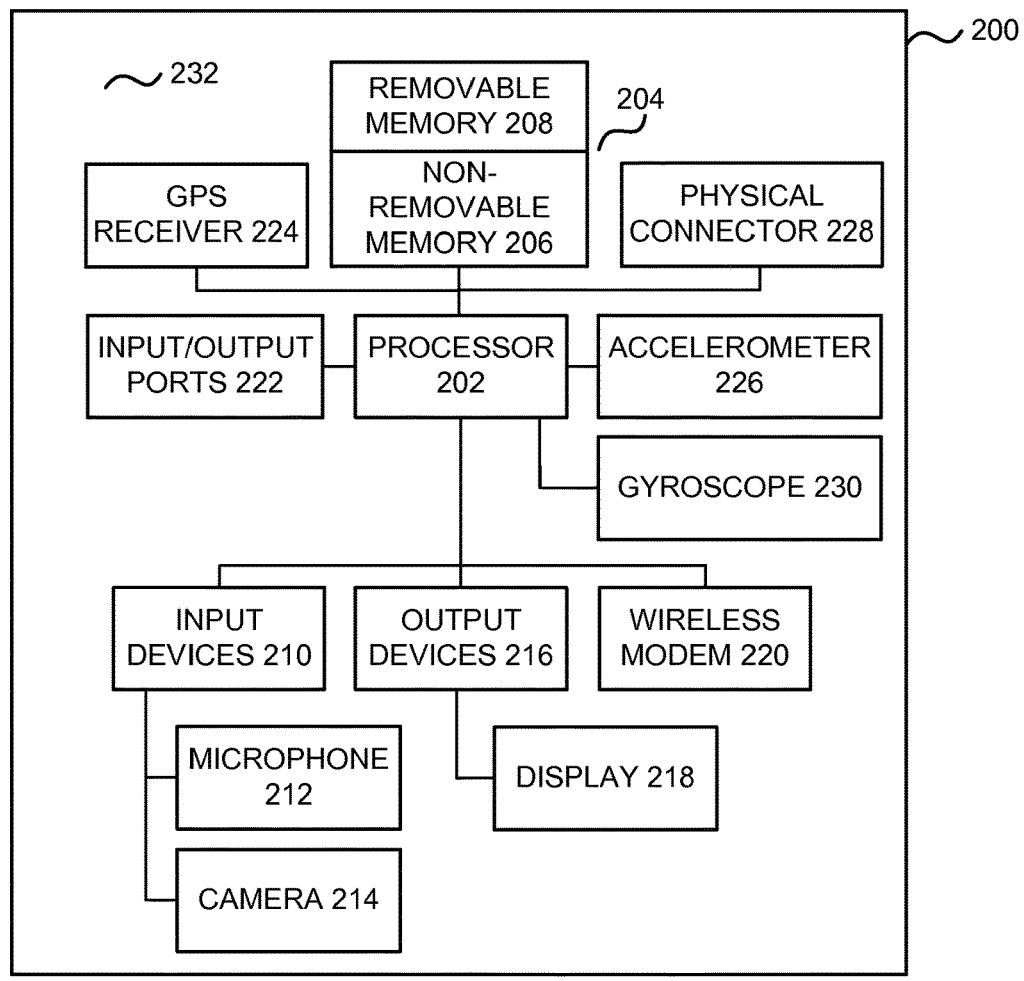
FIG. 2 illustrates a system diagram of a wearable apparatus for providing a context related view.

As illustrated in FIG. 2, the wearable apparatus 200 may comprise the microphone 212 as an e input device for receiving voice commands from the user. The microphone may also act as a detector configured to detect user input. The apparatus may also comprise a device or devices (for example, the accelerometer 226 and/or the gyroscope 230) able to detect a tilting angle of the head of the user or a device that is able to detect the direction to which the user looks. If the feet of the user need to recognized, the recognition may be made based on image data from the camera 214.

The processor 202 may be configured to detect a context related view activation input from the user. In response to detecting the context related view activation input from the user, the processor 202 is configured to determine a context. The term "context" refers to one or more parameters that alone or together define the user's current state. For example, at least one of a location of the user, time, movement status of the user, position of the user and orientation of the user, status of the user (for example, calendar status), status of the wearable apparatus or an apparatus connected to the wearable apparatus, and connectivity of the wearable apparatus may affect to the context. When the context has been determined, the processor 202 is configured to cause a view relating to the context to be provided with the wearable apparatus such that the view appears to be at ground level around at least one foot of the user. In one example, the display device is used to provide the view relating to the context to the user. The display 218 may be used to provide the view relating to the context.

The wearable apparatus 200 may be implemented as eyeglasses, and augmented reality (AR) may be used to provide the view relating to the context. The user wearing the eyeglasses sees the real world and there may be a transparent lens, glass or display where the view is displayed. In another example, the wearable apparatus 200 may project the view relating to the context directly to an eye or eyes. The wearable apparatus 200 may be implemented also as a device which provides a full display of the surroundings to the user. For example, the apparatus may have one or more cameras that provide a live view of the surroundings to the user. Image data from the camera or cameras is then shown to the user using a display screen of the apparatus, and virtual elements, such as the view relating to the context, may be embedded to the data shown in the display screen.

The wearable apparatus 200 may track the direction and the orientation of the device, for example, based on data received from the gyroscope 230 and/or accelerometer 226. This data may be used to determine where the user is looking at.

Further, visual texturing may be used in providing the context related view. When the user is looking at the ground, the wearable apparatus 200 draws graphics that appear projected on the ground surface. For example, the wearable apparatus 200 may know the angle of where the user is currently looking based on data from the accelerometer 226 and the gyroscope 230. Drawing a texture over a surface can be done in several levels of detail. For example, it is possible to approximate or measure what is the distance to the ground level, and a two-dimensional plane may be drawn on the ground. In theory the user can be standing or sitting. The user may set input his height to the apparatus, and while the user is standing, it is possible to learn the size of their feet from that viewpoint. If the wearable apparatus 200 detects the feet at that size, it may deduce that the user is standing. If the wearable apparatus 200 detects that the feet are larger, the wearable apparatus 200 is able to deduce that the user is sitting or kneeling down. Alternatively or in addition, the wireless apparatus 200 may also comprise a depth sensor or sensors that are able to measure the distance from a viewpoint to the ground. Then through object tracking it is possible to keep the texture on the ground. When looking left and right, the wearable apparatus 200 knows which virtual pixels should stick to real world seen pixels.

The wearable apparatus 200 may also be able to track the feet of the user. A 3D depth camera may be used to track the feet. The tracking is also able to tell if the user makes some foot gesture, for example, selects some item of the graphics provided at the ground level.

For better user experience the user's feet may block those parts of the graphical view falling on the user's feet. Based on the feet tracking discussed above, it is possible to mask the parts of the graphical view so that the feet are seen on the top of the graphical view.

Figure 3A:
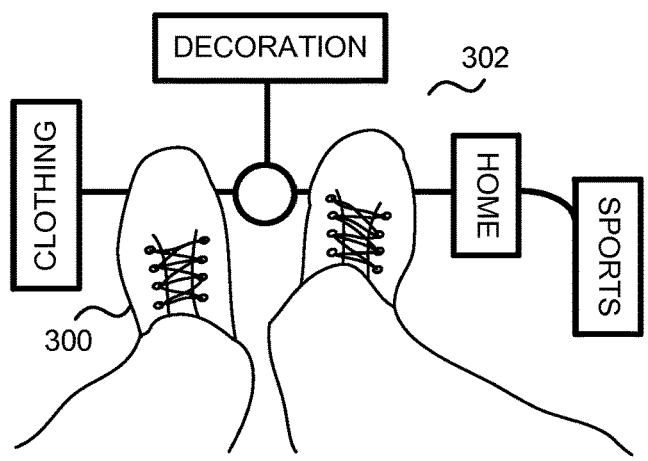
FIG. 3A illustrates an example of a context related view provided to a user.

FIG. 3A illustrates an example of a context related view provided to a user with a wearable apparatus. The wearable apparatus refers, for example, to eyeglasses which are able to provide an augmented reality to the real-world view that the user sees. The wearable apparatus recognizes a specific input from the user and in response to the input, determines a context relating to the user and/or to the wearable apparatus. The specific input may be a voice command from the user. The specific input may also be that the user may also tilt his head towards this feet and the wearable apparatus detects the tilting.

In the example of FIG. 3A, the wearable apparatus recognizes that the user wearing the wearable apparatus is in a specific store. The recognition may be made, for example, using position information provided by a satellite positioning receiver. In this example the context comprises the position information and the fact that the user has entered the store. In response to determining this context, the wearable apparatus is able to automatically retrieve a general map of the store.

The wearable apparatus provides a view 302 relating to the context to the user such that the view appears to be at ground level around at least one foot 300 of the user. In this example, certain main product categories are shown to the user in the view 302. The location of each product category at the ground level indicates in which direction the product category resides within the store.

The example in FIG. 3A also discloses that the wearable apparatus may detect the location of the feet of the user. In order to provide an enhanced view to the user, the view 302 may be provided at ground level such that the user's feet block those parts of the view 302 falling on the user's feet. In other words, the user gets the impression that he is literally standing on the view.

Figure 3B:
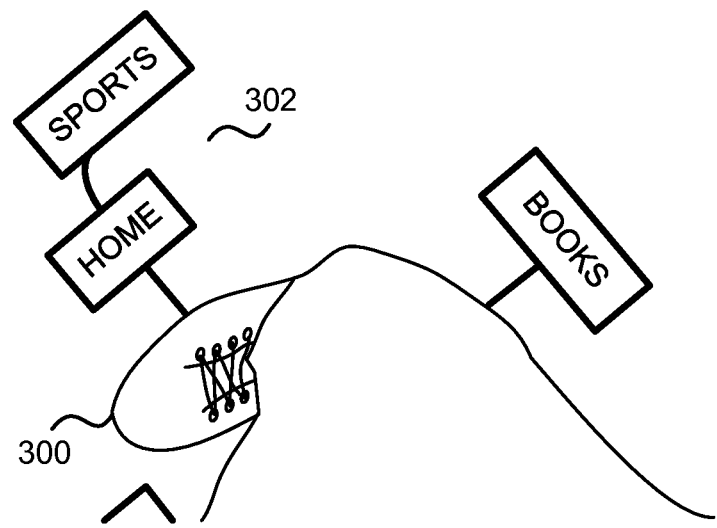
FIG. 3B illustrates another example of a context related view provided to a user.

FIG. 3B illustrates another example of a context related view provided to a user. The view 302 illustrated in FIG. 3B is the same view as in FIG. 3A but from a different viewing angle. As illustrated in FIG. 3B, the view 302 may continue "behind" the user. From the view 302 in FIG. 3B the user learns that books reside in the direction behind the user.

When the view 302 is provided to the user and the user gives a view deactivation input the view 302 is removed and is not provided to the user any more. The deactivation input may be a voice command from the user. Alternatively, the wearable apparatus may detect that the user raises his head and does not any more look towards his feet.

Figure 4:
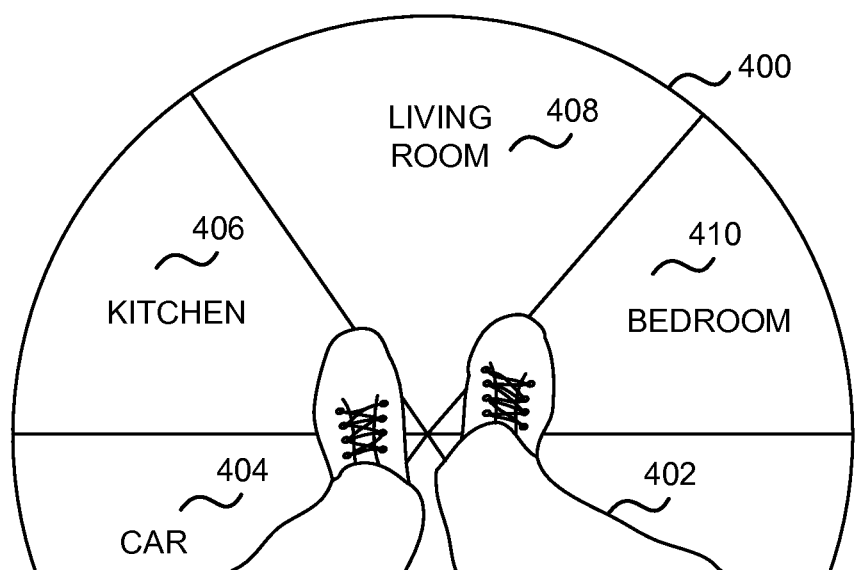
FIG. 4 illustrates another example of a context related view provided to a user.

FIG. 4 illustrates another example of a context related view provided to a user. In the example of FIG. 4 a wearable apparatus detects that the user is at home. When the wearable apparatus receives a specific command from the user (for example, the user tilts his head towards his feet), a view 400 is shown to the user so that the view 400 appears to be at the ground level around the feet 402 of the user. The wearable apparatus may also have detected that the user has entered his house using the front door.

The view 400 in FIG. 4 is a control view via which the user is able to control various items or devices within the house. A view 400 illustrated in FIG. 4 includes four items, "car" 404, "kitchen" 406, "living room" 408 and "bedroom" 410. Items 404-410 in the view 400 may also indicate directions where the rooms or items reside in the house. For example, the living room 408 resides in front of the user. The user is able to select any of the items in the view 400. The selection may be made via a voice command. Alternatively, the user may select an item in the view 400, for example, by "stepping" on the item with his foot. This means that the wearable apparatus may be able to recognize that the user makes the selection by making a foot gesture with his foot. In this example, the user selects the living room 408 by stepping on the sector of the living room 408.

In one example of FIG. 4, the view 400 may be a layer view. By making, for example, a swiping action with his foot across the view 400, the user may be able to change the view to a subsequent layer view. In terms of FIG. 4, the subsequent view could include, for example, additional rooms not disclosed yet by the view 400.

The example in FIG. 4 illustrates an intuitive and easy way to select an item in the context related view appearing to be at ground level around at least one foot of the user by using, for example, a foot of the user or a voice command.

Figure 5:
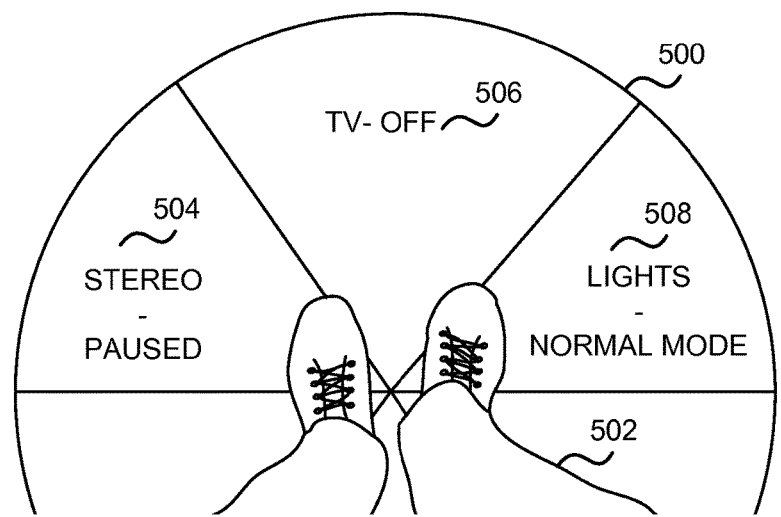
FIG. 5 illustrates another example of a context related view provided to a user after a user has selected an item of a previous context related view.

FIG. 5 illustrates another example of a context related view provided to a user after the user has selected the living room item 408 of FIG. 4. A view 500 illustrated in FIG. 5 includes three items, "stereo" 504, "TV" 506 and "lights" 508. The view 500 may be shown to the user so that the view 500 appears to be at the ground level around feet 502 of the user. Each of these items may be used to control the device indicated by the corresponding item or another view may be provided to the user after a selection of an item. For example, if the user selects TV 506, the wearable apparatus sends a command to the TV to switch on. The wearable apparatus may be connected to a local wireless network established within the house, and the command may be sent to the TV via the local wireless network. Similarly, if the user selects lights 508, the wearable apparatus may send a command to a home automation system to switch on the lights in the living room. As already illustrated in FIG. 4, the user may select an item in the view 500 by "stepping" on the item with his foot. Further, as indicated in FIG. 5, the items

504, 506, 508 may also include status information relating to the items. For example, the item 506 may indicate that the TV is currently in off state.

The example disclosed in FIG. 5 provides an easy and intuitive way to control external devices. Further, when status information is provided with the view, the user knows the status information automatically and the does not have to manually check the status of each external device or system.

Figure 6:
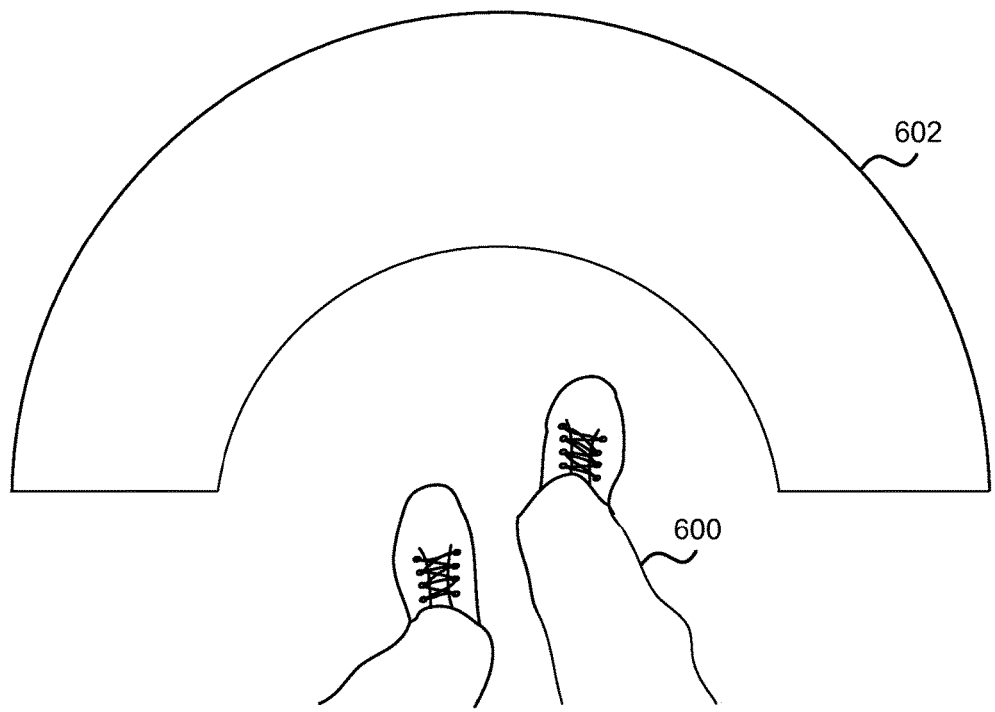
FIG. 6 illustrates another example of a context related view provided to a user when the user is moving.

FIG. 6 illustrates another example of a context related view provided to a user when the user is moving. The example illustrated in FIG. 6 differs from the previous examples that the user is moving, for example, walking or running. When the user is moving it may not be practical to provide a view at ground level close to the feet 600 of the user since the user may collide with something if he does not keep his eyes forward. When the user is moving, the wearable apparatus may be configured to provide the view further away from the feet 600, as illustrated in FIG. 6 by a section 602. In one example, the user may activate the view by tilting his head by a predetermined amount or be giving a predetermined voice command. The required tilting angle of the head to enable the view may be smaller when the user is moving (for example, walking or running) than when the user remains stationary. The wearable apparatus may also automatically determine a view mode and possibly also automatically adjust the view mode. For example, when the user is standing still, the view as illustrated in FIG. 3A may be provided. On the other hand, then the user is walking or running, the view as illustrated in FIG. 6 may be provided. The wearable apparatus may detect whether the user's feet remain stationary (i.e. the user is standing still) or whether the feet are moving (i.e. the user is walking or running). The wearable apparatus may also use information provided by an acceleration sensor or a gyroscope to determine whether the user is moving or not. FIG. 6 illustrates an example where the wearable apparatus is able to adapt the view automatically based on movement status of the user. When the view is provided further away from the feet of the user, the user is able to check the contents of the view and is still able to concentrate to the surroundings ahead.

Figure 7:
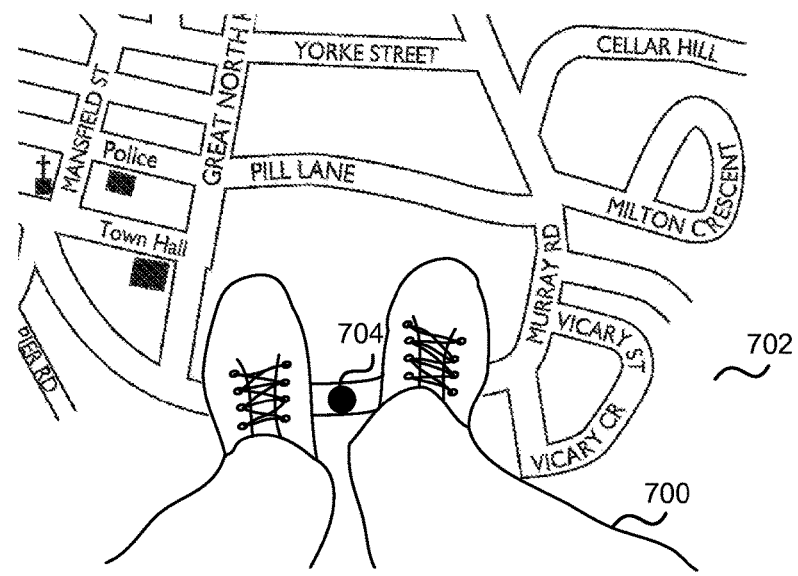
FIG. 7 illustrates another example of a context related view provided to a user.

FIG. 7 illustrates another example of a context related view 702 provided to a user. The map view 702 may be provided to the user when the user is walking on a street and the user stops to wonder where he is at the moment. The user is carrying a wearable apparatus and the map view 702 is automatically activated, for example, when the wearable apparatus detects that the user tilts his head towards his feet 700. When the wearable apparatus detects that the user starts to tilt his head, it may automatically determine the user's position and to retrieve a map which includes the immediate surroundings of the user. The map view 702 may indicate the user's current position on the map with an indicator 704 between the user's feet. When the user is satisfied and tilts his head back to "normal" position, the wearable apparatus automatically removes the view 702.

In one example of FIG. 7, the user may still reside within a store but the wearable apparatus detects that the user is heading towards an exit of the store. Thus, the wearable apparatus is able to assume that the user will soon exit the store. If the user then stops within the store before exiting the store and starts to tilt his head towards his feet, the wearable apparatus deduces that the user wishes to a have a map view including a street view outside the store. Therefore, the wearable apparatus may provide a street map view 702 to the user although the user is still within the store.

In one example of FIG. 7, the user may be able to control a zooming factor of the street map with his foot by making a foot gesture. For example, if the user moves his foot slowly in a certain direction, for example, from left to right, the wearable apparatus may zoom out the map view as long as the foot is moving. Similarly, if the user moves his foot slowly in another direction, for example, from right to left, the wearable apparatus may zoom in the street map view as long as the foot is moving. Although only some examples of possible foot gestures are discussed above, the available foot gestures may include any other foot gesture, for example, single tap, double tap, long tap swiping action etc.

The examples described above enable an intuitive way for a user to automatically activate and deactivate a context related view. The examples provide also an intuitive way to select an item in the context related view appearing to be at ground level around at least one foot of the user by using a foot of the user.

An example of a method for providing a context related view with a wearable apparatus comprises detecting a context related view activation input from a user, determining a context in response to detecting the context related view activation input from the user, and causing a view relating to the context to be provided with the wearable apparatus such that the view appears to be at ground level around at least one foot of the user.

In one example, detecting a context related view activation input from a user comprises detecting a voice command from the user.

In one example, alternatively or in addition, detecting a context related view activation input from a user comprises detecting tilting of the head of the user towards the feet of the user.

In one example, alternatively or in addition, the method comprises prior to causing a context related view to be provided with the wearable apparatus, detecting at least one foot of the user, and causing the view relating to the context to be provided at ground level around the at least one foot of the user such that the least one foot blocks those parts of the view falling on the at least one foot.

In one example, alternatively or in addition, the method comprises detecting a context related view deactivation input from a user, and removing the view relating to the context appearing to be at the ground level around the at least one foot of the user.

In one example, alternatively or in addition, the view relating to the context comprises a map view.

In one example, alternatively or in addition, the view relating to the context comprises a control view comprising at least one item to be selected by the user.

In one example, alternatively or in addition, the position of an item in the control view reflects the direction of the item with respect to the user.

In one example, alternatively or in addition, the method comprises recognizing a selection of an alternative of the at least one alternative, the selection being made with a foot of the user.

In one example, alternatively or in addition, the method comprises causing, in response to the selection, a secondary view to be provided with the wearable apparatus such that the secondary view appears to be at ground level around the at least one foot of the user.

In one example, alternatively or in addition, the method comprises causing transmission of a command controlling an entity other than the wearable apparatus in response to the selection.

In one example, alternatively or in addition, the context comprises at least one of the following: location of the user, time, movement status of the user, position of the user, orientation of the user, status of the user, status of the wearable apparatus or an apparatus connected to the wearable apparatus, and connectivity of the wearable apparatus.

An example of a wearable apparatus for providing a context related view comprises at least one processing unit, at least one memory, wherein the at least one memory stores program instructions that, when executed by the at least one processing unit, cause the apparatus to detect a context related view activation input from a user, determine a context in response to detecting the context related view activation input from the user, and cause a view relating to the context to be provided with the wearable apparatus such that the view appears to be at ground level around at least one foot of the user.

In one example, the at least one memory stores program instructions that, when executed by the at least one processing unit, cause the apparatus to detect a context related view activation input from a user by detecting a voice command from the user.

In one example, alternatively or in addition, the at least one memory stores program instructions that, when executed by the at least one processing unit, cause the apparatus to detect a context related view activation input from a user by detecting tilting of the head of the user towards the feet of the user.

In one example, alternatively or in addition, the at least one memory stores program instructions that, when executed by the at least one processing unit, cause the apparatus to prior to causing a context related view to be provided with the wearable apparatus, detecting at least one foot of the user, and causing the view relating to the context to be provided at ground level around the at least one foot of the user such that the least one foot blocks those parts of the view falling on the at least one foot.

In one example, alternatively or in addition, the at least one memory stores program instructions that, when executed by the at least one processing unit, cause the apparatus to detect a context related view deactivation input from a user, and remove the view relating to the context appearing to be at the ground level around the at least one foot of the user.

In one example, alternatively or in addition, the view relating to the context comprises of one the following: a map view determined based on the context, or a control view comprising at least one item to be selected by the user.

In one example, alternatively or in addition, position of an item in the control view reflects the direction of the item with respect to the user.

In one example, alternatively or in addition, the at least one memory stores program instructions that, when executed by the at least one processing unit, cause the apparatus to recognize a selection of an item of the at least one item, the selection being made with a foot of the user.

In one example, alternatively or in addition, the at least one memory stores program instructions that, when executed by the at least one processing unit, cause the apparatus to cause, in response to the selection, a secondary view to be provided with the wearable apparatus such that the secondary view appears to be at ground level around the at least one foot of the user.

In one example, alternatively or in addition, the at least one memory stores program instructions that, when executed by the at least one processing unit, cause the apparatus to cause transmission of a command controlling an entity other than the wearable apparatus in response to the selection.

In one example, alternatively or in addition, the context comprises at least one of the following: location of the user, time, movement status of the user, position of the user, orientation of the user, status of the user, status of the wearable apparatus or an apparatus connected to the wearable apparatus, and connectivity of the wearable apparatus.

An example of a wearable apparatus comprises a display device, a detector configured to detect user input, at least one processing unit, at least one memory, wherein the at least one memory stores program instructions that, when executed by the at least one processing unit, cause the apparatus to detect, with the detector, a context related view activation input from a user, determine a context in response to detecting the context related view activation input from the user, and provide, with the display device, a view relating to the context such that the view appears to be at ground level around at least one foot of the user.

An example of a wearable apparatus for providing a context related view comprises means for detecting a context related view activation input from a user, means for determining a context in response to detecting the context related view activation input from the user, and means for causing a view relating to the context to be provided with the wearable apparatus such that the view appears to be at ground level around at least one foot of the user.

An example of a wearable apparatus comprises means for displaying, means for detecting a context related view activation input from a user, means for determining a context in response to detecting the context related view activation input from the user, and means for providing, with the means for displaying, a view relating to the context such that the view appears to be at ground level around at least one foot of the user.

An example of a computer program for providing a context related view comprises program instructions, which when executed by a processor cause an apparatus to detect a context related view activation input from a user, determine a context in response to detecting the context related view activation input from the user, and cause a view relating to the context to be provided with the wearable apparatus such that the view appears to be at ground level around at least one foot of the user. In one example, the computer program is embodied on a computer-readable medium.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

The functions described herein performed by a controller may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

Although the subject matter may have been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages.

Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

The invention claimed is:

1. A method for providing a context related view with a wearable apparatus, the method comprising:
   detecting a context related view activation input from a user;
   determining a context in response to detecting the context related view activation input from the user, the context comprising a location of the user;
   determining whether the user is not stationary;
   upon determining that the user is stationary and that the user is looking toward a ground based on a first tilt of a head of the user is past a first predefined tilt angle, causing the map relating to the context to be provided with the wearable apparatus such that the view appears to be at ground level; and
   upon determining that the user is not stationary and that the user is looking toward the ground based on a second tilt of the head of the user is past a second predefined tilt angle, causing the map relating to the context to be provided with the wearable apparatus such that the view appears to be at the ground level, the first predefined tilt angle being greater than the second predefined tilt angle.

2. The method according to claim 1, wherein the context further comprises a movement status of the user.

3. The method according to claim 1, wherein detecting the context related view activation input from a user comprises detecting tilting of the head of the user towards the feet of the user.

4. The method according to claim 1, comprising:
   prior to causing the map related to the context to be provided with the wearable apparatus, detecting at least one foot of the user; and
   causing the map relating to the context to be provided at ground level around the at least one foot of the user such that the least one foot blocks those parts of the view falling on the at least one foot.

5. The method according to claim 1, comprising:
   detecting a context related view deactivation input from the user; and
   removing the view relating to the map appearing to be at the ground level around at least one foot of the user.

6. The method according to claim 1, wherein the context further comprises a status of the wearable device.

7. The method according to claim 1, further comprising causing a control view comprising at least one item to be selected by the user to be provided with the wearable apparatus.

8. The method according to claim 7, wherein position of an item in the control view reflects a direction of the item with respect to the user.

9. The method according to claim 7, comprising:
   recognizing a selection of an item of the at least one item, the selection being made with a foot of the user.

10. The method according to claim 9, comprising:
    causing, in response to the selection, a secondary view to be provided with the wearable apparatus such that the secondary view appears to be at ground level around at least one foot of the user.

11. The method according to claim 9, comprising:
    causing transmission of a command controlling an entity other than the wearable apparatus in response to the selection.

12. The method according to claim 1, wherein the context comprise three or more of the following:
    time;
    position of the user;
    orientation of the user;
    status of the user;
    status of an apparatus connected to the wearable apparatus, and connectivity of the wearable apparatus.

13. A wearable apparatus, comprising:
    at least one processing unit;
    at least one memory;
    wherein the at least one memory stores program instructions that, when executed by the at least one processing unit, cause the apparatus to:
    detect a context related view activation input from a user;
    determine a context in response to detecting the context related view activation input from the user, the context comprising a location of the user;
    determine whether the user is not stationary;
    upon determining that the user is stationary and that the user is looking toward a ground based on a first tilt of a head of the user is past a first predefined tilt angle, causing the map relating to the context to be provided with the wearable apparatus such that the view appears to be at ground level; and
    upon determining that the user is not stationary and that the user is looking toward the ground based on a second tilt of the head of the user is past a second predefined tilt angle, causing the map relating to the context to be provided with the wearable apparatus such that the view appears to be at the ground level, the first predefined tilt angle being greater than the second predefined tilt angle.

14. The wearable apparatus according to claim 13, wherein the at least one memory stores program instructions that, when executed by the at least one processing unit, cause the apparatus to detect a context related view activation input from a user by detecting a voice command from the user.

15. The wearable apparatus according to claim 13, wherein the at least one memory stores program instructions that, when executed by the at least one processing unit, cause the apparatus to detect a context related view activation input from a user by detecting tilting of a head of the user towards the feet of the user.

16. The wearable apparatus according to claim 13, wherein the at least one memory stores program instructions that, when executed by the at least one processing unit, cause the apparatus to:
   detect a context related view deactivation input from user; and
   remove the map relating to the context appearing to be at the ground level around the at least one foot of the user.

17. The wearable apparatus according to claim 13, wherein the map relating to the context further comprises of one the following:
   a control view comprising at least one item to be selected by the user.

18. The wearable apparatus according to claim 17, wherein the at least one memory stores program instructions that, when executed by the at least one processing unit, cause the apparatus to:
   recognize a selection of an item of the at least one item, the selection being made with a foot of the user.

19. The wearable apparatus according to claim 13, wherein the context comprises at least one of the following:
   time;
   movement status of the user;
   position of the user;
   orientation of the user; and
   status of the user;
   status of the wearable apparatus or an apparatus connected to the wearable apparatus; and
   connectivity of the wearable apparatus.

20. A wearable apparatus, comprising:
   a display device;
   a detector configured to detect user input;
   at least one processing unit;
   at least one memory;
   wherein the at least one memory stores program instructions that, when executed by the at least one processing unit, cause the apparatus to:
   detect, with the detector, a context related view activation input from a user;
   determine a context in response to detecting the context related view activation input from the user, the context comprising a location of the user;
   determine whether the user is not stationary;
   upon determining that the user is stationary and that the user is looking toward a ground based on a first tilt of a head of the user is past a first predefined tilt angle, causing the map relating to the context to be provided with the wearable apparatus such that the view appears to be at ground level; and
   upon determining that the user is not stationary and that the user is looking toward the ground based on a second tilt of the head of the user is past a second predefined tilt angle, causing the map relating to the context to be provided with the wearable apparatus such that the view appears to be at the ground level, the first predefined tilt angle being greater than the second predefined tilt angle.

\* \* \* \* \*